Patented Apr. 3, 1923.

1,450,678

UNITED STATES PATENT OFFICE.

HARRY D. GIBBS, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING PHTHALIMIDS.

No Drawing.   Application filed February 24, 1920. Serial No. 360,828.

*To all whom it may concern:*

Be it known that I, HARRY D. GIBBS, a citizen of the United States, and a resident of Penns Grove, in the county of Salem and State of New Jersey, have invented a certain new and useful Process of Producing Phthalimids, of which the following is a specification.

This invention relates to the production of phthalimids, and comprises inducing a reaction between napthalene, oxygen, and a primary amine, or between phthalic anhydride and a primary amine, while the several reacting substances are in the vapor phase. When phthalimid itself is to be produced ammonia is used in place of a primary amine.

One object of my invention is to provide a continuous process for the production of phthalimids from naphthalene, air and ammonia or primary amines.

Other objects of my invention will be apparent from the following description.

I have discovered that good yields of phthalimids are obtainable by the catalytic oxidation of naphthalene in vapor form in the presence of vapors of ammonia or primary amines; and that excellent yields of phthalimids are also obtainable by bringing the vapors of ammonia or primary amines into contact with the phthalic anhydride-containing vapors resulting from the catalytic oxidation of naphthalene.

The condensed equation for these reactions can be written as follows:—

2C$_{10}$H$_8$+9O$_2$+2NH$_2$R=2C$_8$H$_4$O$_2$NR+4CO$_2$+6H$_2$O where R represents a hydrogen, alkyl, or aryl radical. The compound NH$_2$R may be referred to generically as a substance containing the group NH$_2$.

Catalysts which I have found suitable for accelerating the oxidation of naphthalene by air, are the oxides, and other compounds, of metals of the fifth, sixth and eighth groups of the periodic system, and particularly the oxides of vanadium, molybdenum, nickel, and platinum. The catalyst is preferably deposited on, or caused to impregnate, an inert carrier or porous material such as asbestos, pumice, etc.

In practicing my invention, naphthalene is heated above its melting point and a current of oxygen or air is passed thereover at such a rate that there will be in the resulting vapor mixture an excess of oxygen over that theoretically required for the oxidation of the naphthalene present to phthalic anhydride. This mixture is then brought into close contact with any one of the above-mentioned catalysts while maintaining the temperature of the catalyst between 200 and 650° C., and preferably at from 400 to 500° C. As the gas mixture leaves the catalyst it is mixed with the vapors of ammonia or a primary amine, as the case may be; the resulting reaction products are then cooled to condense and separate from the more volatile products the phthalimid or substituted phthalimid which has been formed.

Instead of mixing the ammonia or primary amine with the gases leaving the catalyst, the ammonia or primary amine may be mixed with the air or with the naphthalene vapors, or introduced into the air-naphthalene vapor mixture, at any time prior to the oxidation of the naphthalene.

In patents 1,284,888 and 1,285,117 it has been shown that phthalic anhydride can be satisfactorily produced by passing an air-naphthalene vapor mixture into close contact with a catalyst composed of an oxide of vanadium or molybdenum. The equation for the reaction may be written:—

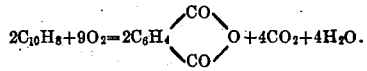

It seems probable that in the formation of phthalimids according to my invention in which a mixture of primary amine naphthalene vapor, and air are passed over the catalyist, the naphthalene is first oxidized to phthalic anhydride, and the latter, perhaps in the nascent state, reacts with the primary amine to form the phthalimid, in accordance with the following equation

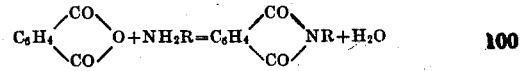

where R represents a hydrogen, alkyl, or aryl radical.

As examples of primary amines which I may use as the source of the imid-nitrogen there may be mentioned methylamine ethylamine, yielding the corresponding alkyl-phthalimids; and aniline, o—, m—, and p— toluidines, zylidines, phenylenediamines, naphthylamines, amino-acids, amino-phenols, halogenated primary amines such as chloraniline, etc., yielding the corresponding aryl-phthalimids.

My invention, although preferably carried out by bringing ammonia or a primary amine into contact with vapors of phthalic anhydride resulting directly from the catalytic oxidation of vapors of naphthalene, is not limited to this procedure, but may also be carried out by vaporizing phthalic anhydride produced by any method and mixing these vapors with ammonia or a primary amine. I consider it essential however that the reaction be brought in the vapor phase, and preferably at a temperature above 100° C.

The new process may be illustrated by the following examples.

*I. Phthalimid.*

Naphthalene vapor is mixed with air in excess of the amount theoretically required to oxidize the naphthalene to phthalic anhydride, and the mixture is passed through finely powdered oxids of vanadium maintained at a temperature of about 500° C. As the products of reaction issue from the reaction chamber containing the catalyst they are mixed with ammonia at such a rate that all of the phthalic anhydride which is present in the gas mixture will be converted into phthalimid. The gas mixture is then cooled to condense the phthalimid thus formed. The rate at which it is necessary to introduce ammonia may be readily determined by testing the gas mixture leaving the catalyst for its phthalic anhydride content, or by testing the final gas mixture, after condensing out all the phthalimid, to ascertain the extent to which ammonia in excess has been used.

*II. Methyl-phthalimid.*

A current of heated air carrying naphthalene and methylamine both in the vapor phase and in such proportion that the gas mixture contains sufficient oxygen to oxidize the naphthalene to phthalic-anhydride and the methylamine in such quantity necessary to convert the phthalic-anhydride formed to methyl phthalimid, is passed into contact with a catalyst as previously described. The naphthalene is oxidized to phthalic-anhydride and so soon as any phthalic-anhydride is formed, it is converted to methyl phthalimid by the methylamine. In this way the phthalic-anhydride is fixed by the union with the methylamine so soon as it is formed, the process being continuous.

*III. Phthalanil (i. e., phenyl-phthalimid.)*

Naphthalene vapor is mixed with air in excess of the amount theoretically required to oxidize the naphthalene to phthalic-anhydride, and the mixture is then passed through finely powdered oxids of vanadium maintained at a temperature of about 500° C. The gases as they pass out of chamber 4 contain among other products of the reaction, phthalic-anhydride in the vapor phase and these gases are at this point, mixed with an amount of aniline sufficient to unite with the phthalic-anhydride. The reaction between the phthalic-anhydride and the aniline takes place at once in the sense of the equation:

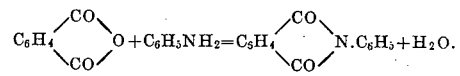

and the products of the reaction pass into a condensing chamber where the gases are cooled. The solid products of the reaction condense and may be removed through suitable outlets, while the gases pass on to be further treated, if desired, for the recovery of by-products.

*IV. Para-tolyl-phthalimid.*

Phthalic anhydride which has been produced by the catalytic, vapor phase, oxidation of naphthalene, or by any other process, is vaporized and mixed with the vapors of para-toluidine at a temperature above the vaporization point of para-toluidine. The products of the reaction are carried through a condensing chamber where the para-tolyl-phthalimid is condensed and separated from water vapor and any phthalic anhydride or para-toluidine that may have failed to react.

The particular amines mentioned in the above examples may be replaced by other primary amines depending upon the particular phthalimid desired. Although a phthalimid is the principal product formed in the above examples, it will be understood that other products may be formed in smaller quantities, depending upon the conditions of the reaction.

While I have described my invention above in detail, I wish it to be understood that many changes may be made therein without departing from the spirit of my invention.

I claim:

1. The process of producing a phthalimid which comprises causing a substance containing the group $NH_2$ to react with the products of the catalytic oxidation of naphthalene to phthalic anhydride, the reacting substances being present in the vapor phase.

2. The process of producing a phthalimid which comprises passing a gaseous mixture consisting of naphthalene, oxygen, and a substance containing the group $NH_2$ into contact with a catalyst capable of accelerating the oxidation of the naphthalene to phthalic anhydride, while maintaining the catalyst at a temperature between 200 and 650° C.

3. The process of producing a phthalimid which comprises passing a gaseous mixture consisting of naphthalene, oxygen, and a substance containing the group $NH_2$ into contact with a catalytic compound of a metal of one of the fifth, sixth and eighth groups of the periodic system, while maintaining the catalyst at a temperature between 200 and 650° C.

4. The process of producing a phthalimid which comprises passing a gaseous mixture containing naphthalene, oxygen, and a primary amine into contact with a catalyst capable of accelerating the oxidation of the naphthalene to phthalic anhydride, while maintaining the catalyst at a temperature between 200 and 650° C.

5. The process of producing a phthalimid which comprises forming a mixture, while in the vapor phase, of phthalic anhydride and a primary amine.

6. The process of producing a phthalimid which comprises forming a mixture, at a temperature above 100° C., of vapors of phthalic anhydride and a substance containing the group $NH_2$.

7. The process of producing an arylphthalimid which comprises forming a mixture, at a temperature above 100° C., of vapors of phthalic anhydride and of a primary arylamine.

8. The process of producing phenylphthalimid which comprises forming a mixture, at a temperature above 100° C., of vapors of phthalic anhydride and of aniline.

9. The process of producing an arylphthalimid which comprises passing over a catalytic oxidizing agent vapors of naphthalene and primary arylamine mixed with a sufficient amount of an oxygen-containing gas to oxidize the naphthalene to phthalic anhydride, while maintaining the catalyst at a temperature between 200 and 650° C.

10. The process of producing phenylphthalimid which comprises passing over a catalytic oxidizing agent vapors of naphthalene and aniline mixed with a sufficient amount of an oxygen-containing gas to oxidize the naphthalene to phthalic anhydride, while maintaining the catalyst at a temperature between 200 and 650° C.

In testimony whereof I affix my signature.

HARRY D. GIBBS.